(12) United States Patent
Sakuma

(10) Patent No.: US 6,671,331 B1
(45) Date of Patent: Dec. 30, 2003

(54) CARRIER DETECTING CIRCUIT FOR DETECTING THE LEVEL OF A RECEIVED SIGNAL AND COMMUNICATION APPARATUS

(75) Inventor: Shigeru Sakuma, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/441,333

(22) Filed: Nov. 16, 1999

(30) Foreign Application Priority Data

Nov. 18, 1998 (JP) .......................................... 10/328609

(51) Int. Cl.[7] ................................................ H03K 9/00
(52) U.S. Cl. ...................... 375/316; 375/326; 375/344; 455/67.11; 455/67.13
(58) Field of Search .............................. 455/67.1, 67.4, 455/296, 63, 226.1, 226.2, 67.11, 67.13, 67.14; 375/316, 340, 345, 344

(56) References Cited

U.S. PATENT DOCUMENTS

| | | | | |
|---|---|---|---|---|
| 5,774,810 A | * | 6/1998 | Sugi | 370/503 |
| 5,867,766 A | * | 2/1999 | Dinc et al. | 455/214 |
| 6,130,577 A | * | 10/2000 | Tamba et al. | 329/304 |
| 6,223,037 B1 | * | 4/2001 | Parkkila | 455/161.3 |
| 6,256,477 B1 | * | 7/2001 | Eidson et al. | 455/296 |
| 6,314,278 B1 | * | 11/2001 | Zamat | 375/345 |
| 6,317,031 B1 | * | 11/2001 | Rickard | 307/3 |
| 6,327,312 B1 | * | 12/2001 | Jovanovich et al. | 375/316 |
| 2001/0046867 A1 | * | 11/2001 | Mizoguchi | 455/452 |

FOREIGN PATENT DOCUMENTS

| | | |
|---|---|---|
| JP | Hei-2-243035 A | 9/1990 |
| JP | Hei-3-6165 | 1/1991 |
| JP | Hei-6-303680 A | 10/1994 |

* cited by examiner

*Primary Examiner*—Dwayne Bost
*Assistant Examiner*—Tsuleun Lei
(74) *Attorney, Agent, or Firm*—Scully, Scott, Murphy & Presser (57) ABSTRACT

An RSSI block cumulating circuit block-cumulates an RSSI signal that has been A/D converted and calculates an RSSI signal in a low level. An RSSI level raising circuit raises the level of the RSSI signal and outputs the resultant signal as a threshold value. An RSSI continuous cumulating circuit always cumulates the RSSI signal. A comparing circuit compares the threshold value with the output signal of the RSSI continuous cumulating circuit and determines whether or not a carrier is present.

18 Claims, 7 Drawing Sheets

ABSTRACT

CARRIER DETECTING CIRCUIT FOR DETECTING THE LEVEL OF A RECEIVED SIGNAL AND COMMUNICATION APPARATUS

BACKGROUND OF THE INVENTION

1. Field of the Invention

The present invention relates to a carrier detecting circuit for detecting the level of a received signal, in particular, to a carrier detecting circuit for use with a radio receiver and a communication apparatus having the carrier detecting circuit.

2. Description of the Related Art

In such a carrier detecting circuit, a logarithmic amplifier output signal of an RF analog circuit is A/D converted into a received signal strength indicator RSSI. The RSSI is compared with a predetermined fixed threshold value. When the RSSI exceeds the threshold value, a carrier detection signal is output as a trigger for determining whether the received signal has been properly detected.

However, if a low value is set as the predetermined threshold value, an undesired carrier is detected due to an interference wave of another system, reception noise, and so forth. Thus, the power will be wasted. In addition, a desired signal will be lost. In contrast, if a high value is set as the predetermined threshold value, a signal with a low RSSI cannot be received. Thus, the reception area becomes narrow.

In a first related art reference as Japanese Patent Laid-Open Publication No. Hei-6-303680, a CSMA/CD (Carrier Sense Multiple Access with Collision detection) type remote controlling system using a wired transmission line such as a bus line is disclosed. In the system, the worst value of the reception level of each terminal is calculated. A threshold value is set for each terminal. Thus, a large noise margin is accomplished.

In a second related art reference as Japanese Patent Laid-Open Publication No. Hei-3-6165, a carrier level setting system that connects modems through a public line is disclosed. In this system, a particular signal with a predetermined data transmission output level is transmitted. As the result of measuring the particular signal level in the received side, with a predetermined carrier detection level table according to the signal level, a carrier detection level is automatically determined.

In a third related art reference as Japanese Patent Laid-Open Publication No. Hei-2-243035, a carrier detection level setting system is disclosed. In the system, the carrier detection level of a secondary channel carrier signal for a data modem is set. The data modem sets a frequency band division type secondary channel for transmitting remote control information corresponding to a half duplex communication protocol using a four-wired communication line system. In this system, when the noise level of the secondary channel exceeds the carrier detection level, the carrier detection level is automatically set to a higher level. In contrast, when the signal level of the received signal becomes lower than the carrier detection level, it is automatically set to a lower level. Thus, a communication defect against the fluctuation of the line characteristics can be prevented.

However, in the above-described related art references, since the threshold value for detecting a received signal corresponding to the level of the electric field is fixed, a carrier may be incorrectly detected due to an external noise and/or an undesired radio wave. In addition, because of a margin for preventing an incorrect carrier from being detected, the threshold value is set to a higher level than the proper level. Thus, the reception area is unnecessarily narrowed. In other words, when a carrier is detected with a predetermined threshold value, the carrier is incorrectly detected and the reception area becomes narrow. However, it is difficult to set a threshold value corresponding to the operational environment of the system for use.

In addition, with one cumulating circuit, a threshold value is measured and a carrier is detected using an RSSI signal that represents the level of the electric field of the received signal. Thus, a carrier cannot be detected at high speed and with high reliability.

SUMMARY OF THE INVENTION

An object of the present invention is to provide a carrier detecting method that detects a carrier with high performance and that suppresses a carrier from being incorrectly detected and the reception area to be widened. Another object of the present invention is to provide a carrier detecting circuit that operates at high speed and with high reliability.

A first aspect of the present invention is a carrier detecting circuit for detecting the threshold value of the level of a carrier that can be received, comprising a means for adaptively varying the threshold value corresponding to a radio environment of a desired radio wave, a disturbed radio wave, and noise.

A second aspect of the present invention is a carrier detecting circuit for detecting a threshold value of the level of a carrier that can be received, comprising an RSSI block cumulating circuit for cumulating an RSSI signal of which the level of the carrier has been detected and A/D converted so as to calculate an RSSI signal in a low level, an RSSI level raising circuit for raising the RSSI signal calculated by said RSSI block cumulating circuit by a predetermined level, an RSSI continuous cumulating circuit for always cumulating the RSSI signal that has been A/D converted, and a comparing circuit for comparing the threshold value that has been raised by said RSSI continuous cumulating circuit with the output signal of said RSSI continuous cumulating circuit so as to determine whether or not a carrier is present.

A third aspect of the present invention is a communication apparatus for detecting a threshold value of the level of a carrier that can be obtained from a received signal, comprising an RSSI block cumulating circuit for cumulating an RSSI signal of which the level of the carrier has been detected and A/D converted so as to calculate an RSSI signal in a low level, an RSSI level raising circuit for raising the RSSI signal calculated by said RSSI block cumulating circuit by a predetermined level, an RSSI continuous cumulating circuit for always cumulating the RSSI signal that has been A/D converted, and a comparing circuit for comparing the threshold value that has been raised by said RSSI continuous cumulating circuit with the output signal of said RSSI continuous cumulating circuit so as to determine whether or not a carrier is present.

According to the present invention, in a region (time period) of which a burst signal is not received, RSSI is cumulated for a predetermined region (time period). Thus, the fluctuation of the noise level is smoothed. An RSSI signal in a low level is detected by an RSSI block cumulating means (101). The level of the output signal of the RSSI block cumulating means (101) is raised by an RSSI level raising means (103) for a predetermined value so as to suppress a carrier from being incorrectly detected. The output signal of the RSSI level raising means (103) is used as a threshold value.

The same fluctuation of the output signal as the clock timing of the A/D conversion is obtained by an RSSI continuous cumulating means (102). The RSSI is always cumulated by the RSSI continuous cumulating means (102) so as to smoothen the fluctuation of the noise level. The output signal of the RSSI continuous cumulating means (102) is compared with the threshold value by a comparing means (104) so as to determine whether or not a carrier is present.

According to the present invention, the threshold value for detecting a carrier is measured in a guard time period between a transmission burst and a reception burst. Thus, since the threshold value is adaptively varied, the communication distance for detecting a carrier can be substantially prolonged. Consequently, the communication area can be widened. In addition, a carrier can be prevented from being incorrectly detected against noise and an interference signal of another system.

In addition, with the cumulating system according to the present invention, since an output signal with the same fluctuation as the clock timing of the A/D conversion is obtained, the fluctuation of the noise level can be smoothed. In addition, a carrier can be detected at high speed. Thus, a synchronous preamble added at the beginning of data is not wasted. In this case, the radio environment means the reception level of a carrier in a desired reception band (for example, the level of a radio wave that fluctuates time by time due to a multi-path or fading and the state of an insertion of an undesired radio wave). In other words, the radio environment means fluctuation states of the level of a desired radio wave, the level of a disturbed radio wave, and the level of noise.

These and other objects, features and advantages of the present invention will become more apparent in light of the following detailed description of a best mode embodiment thereof, as illustrated in the accompanying drawings.

DESCRIPTION OF PREFERRED EMBODIMENTS

Next, with reference to the accompanying drawings, embodiments of the present invention will be described.

Figure 1:
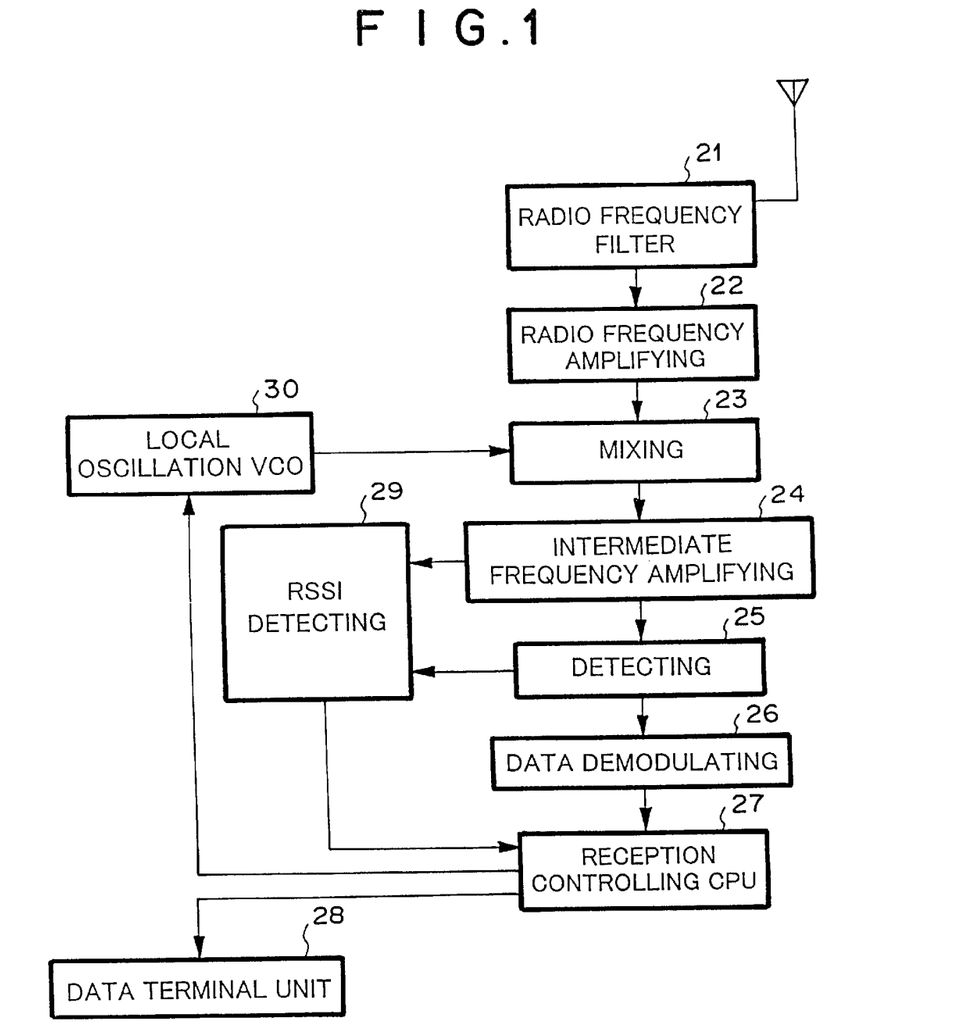
FIG. 1 is a block diagram showing the structure of a receiving portion of a radio station according to a first embodiment of the present invention.

First Embodiment
(Structure of First Embodiment)
FIG. 1 is a block diagram showing the structure of a radio receiver according to a first embodiment of the present invention. In FIG. 1, a radio frequency signal received from an antenna is supplied to a radio frequency filter 21 such as a SAW filter. The radio frequency filter 21 selects a radio frequency signal having a predetermined band width from the received radio frequency signal. The resultant signal is supplied to a radio frequency amplifying portion 22 such as an LNA (Low Noise Amplifier). The radio frequency amplifying portion 22 amplifies the radio frequency signal with low mutual modulation characteristics, large input characteristics, and low noise factor against a disturbed radio wave. The resultant signal is supplied to a mixing circuit 23. The mixing circuit 23 mixes the output signal of the radio frequency amplifying portion 22 with a local oscillation frequency signal oscillated by a local oscillating portion 30 controlled by a CPU 27 and generates an intermediate frequency signal.

Further, the intermediate frequency signal is supplied to an intermediate frequency amplifying portion 24. The intermediate frequency amplifying portion 24 limits the frequency band of the intermediate frequency signal with an intermediate frequency filter and raises the gain of the resultant signal. The output signal of the intermediate frequency amplifying portion 24 is supplied to a detecting circuit portion 25. The detecting circuit portion 25 detects a base band signal from the output signal of the intermediate frequency amplifying portion 24.

An RSSI (Received Signal Strength Indicator) signal is detected by an RSSI detecting portion 29. In other words, the signal level of a carrier that is the intermediate frequency signal is detected by a detecting diode or the like in the intermediate frequency amplifying portion 24 and/or the detecting circuit portion 25. The signal level of the carrier is converted into a predetermined characteristic value by a logarithmic amplifier or the like. The characteristic value is converted into digital data by an A/D converter. The digital data is output to a reception controlling portion 27.

The base band signal that is output from the detecting circuit 25 is supplied to a data demodulating portion 26. The data, demodulating portion 26 demodulates the base band signal to the data structure on the transmitting side. The reception controlling portion (including the CPU) 27 analyzes the data structure on the transmitting side and performs a data signal process such as a data error correcting process for the data, and outputs the resultant data to a data terminal unit 28.

The RSSI detecting portion 29 can be used for a mobile communication unit for a radio communication system, a base station thereof, a microwave transmitting/receiving unit of a public line system, a transmitting system thereof, a receiving portion of a wired transmission system of an LAN (Local Area Network)/WAN (Wide Area Network), and so forth. The RSSI detecting portion 29 is composed of circuits as follow.

Figure 2:
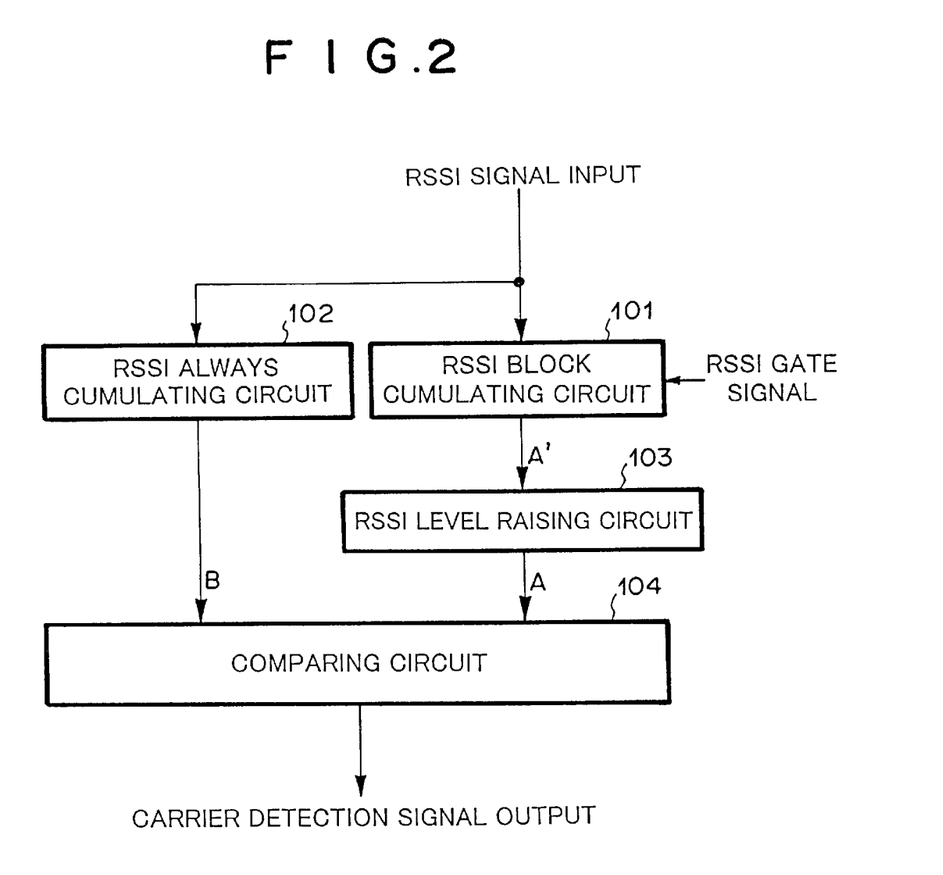
FIG. 2 is a block diagram showing the structure of a carrier detecting circuit according to the first embodiment of the present invention.

FIG. 2 shows the structure of the RSSI detecting portion 29 according to the first embodiment of the present invention. A logarithmic amplifier in the intermediate frequency amplifying circuit detects the level of the electric field of the received signal. The output signal of the logarithmic amplifier is A/D converted into an RSSI signal. The RSSI signal is supplied to an RSSI block cumulating circuit 101 and an RSSI continuous cumulating circuit 102. The RSSI block cumulating circuit 101 cumulates the RSSI signal for a predetermined region in which a burst signal is not received so as to smooth the fluctuation of the noise level. An RSSI level raising circuit 103 raises the level of the RSSI signal received from the RSSI block cumulating circuit 101 by a predetermined value. The resultant value is used as a threshold value (A) for detecting a carrier.

On the other hand, the RSSI continuous cumulating circuit 102 always cumulates the RSSI signal at each clock pulse, smooths the fluctuation of the level of noise, and supplies the resultant signal as an output signal (B) to a comparing circuit 104. The comparing circuit 104 compares the output signal (B) with the threshold value (A) and outputs a carrier detection signal that represents whether or not a carrier is present corresponding to the compared result. The output signal of the comparing circuit 104 is supplied to the reception controlling portion (including the CPU) 27.

Figure 3:
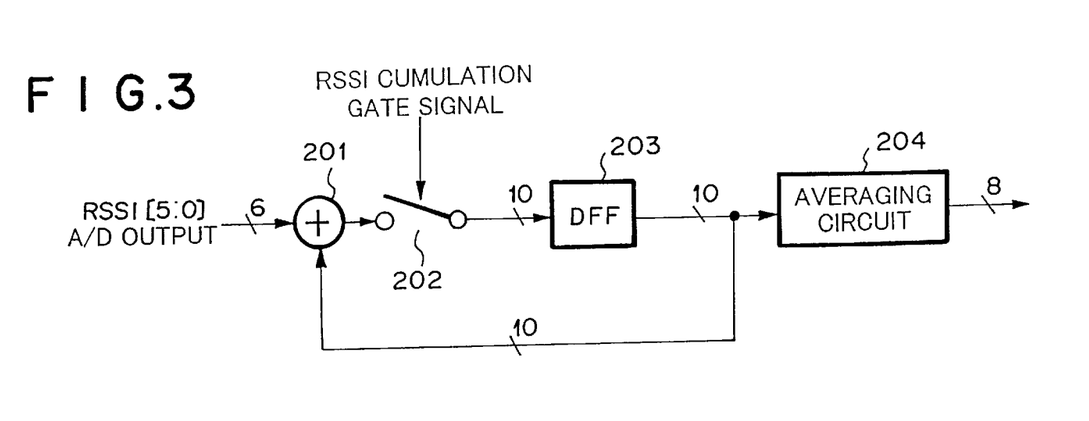
FIG. 3 is a block diagram showing the structure of an RSSI block cumulating circuit according to the first embodiment of the present invention.

FIG. 3 is a block diagrams showing the structure of the RSSI block cumulating circuit 101 according to the first embodiment of the present invention. In FIG. 3, an RSSI signal [5:0] that is output from the A/D converter is supplied to an adding device 201. An output signal of the adding device 201 is supplied to a switch 202. An output signal of the D flip-flop 203 is supplied tot both the adding device 201 and an averaging circuit 204. The adding device 201 adds the RSSI signal [5:5] and the output signal of the D flip-flop 203. The switch 202 is controlled with an RSSI cumulation gate signal. After the adding operation is performed a predetermined number of times, the averaging circuit 204 averages the added signal and outputs a low level RSSI signal from which a noise component has been removed. In FIG. 3, values in individual circuits represent digital bit values of the RSSI signal. For example, RSSI signal [5:0] represents that the RSSI signal has six signal levels from level 63 to level 0 (namely, a resolution of six bits).

Figure 4:
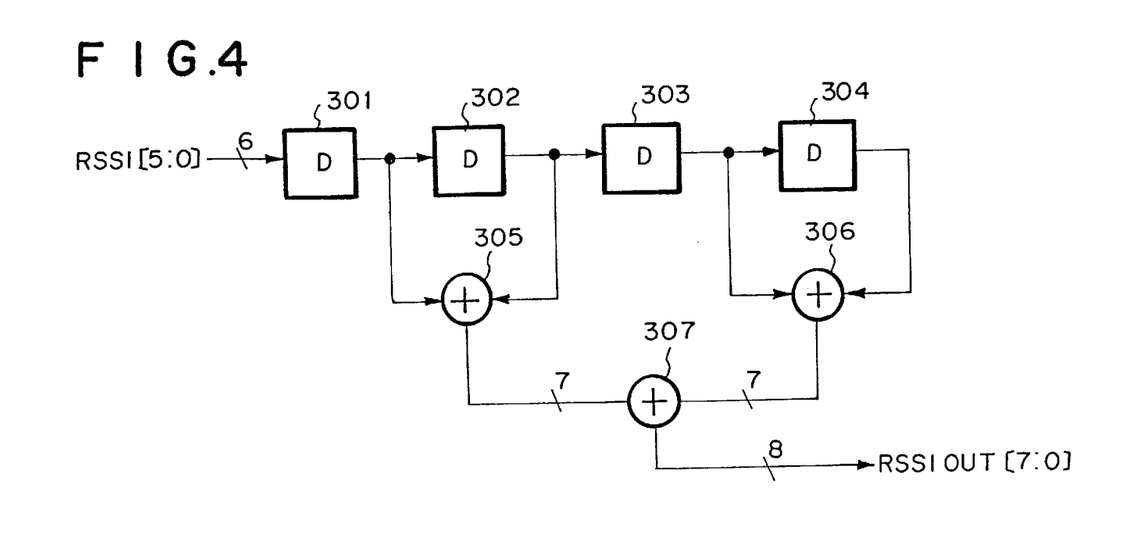
FIG. 4 is a block diagram showing the structure of an RSSI continuous cumulating circuit according to the first embodiment of the present invention.

FIG. 4 is a block diagram showing an example of the structure of the RSSI continuous cumulating circuit 102 according to the first embodiment of the present invention. Referring to FIG. 4, a six-bit digital RSSI signal [5:0] is supplied to a D flip-flop 301. An output signal of the D flip-flop 301 is supplied to both an adding device 305 and a D flip-flop 302. An output signal of the D flip-flop 302 is supplied to both a D flip-flop 303 and the adding device 305. An output signal of the D flip-flop 303 is supplied to both a D flip-flop 304 and an adding device 306. An output signal of the D flip-flop 304 is supplied to the adding device 306. An output signal of the adding device 305 is supplied to an adding device 307. An output signal of the adding device 306 is supplied to the adding device 307. An output signal of the adding device 307 is used as an RSSI signal [7:0] of which the fluctuation of the noise level has been smoothed. Thus, the RSSI continuous cumulating circuit 102 outputs a value obtained by adding the RSSI sip& the number of times corresponding to the number of D flip-flops and the added value is averaged for each clock pulse. Thus, the output value of the RSSI continuous cumulating circuit 102 varies for each clock pulse.

Operation of First Embodiment

Figure 5:
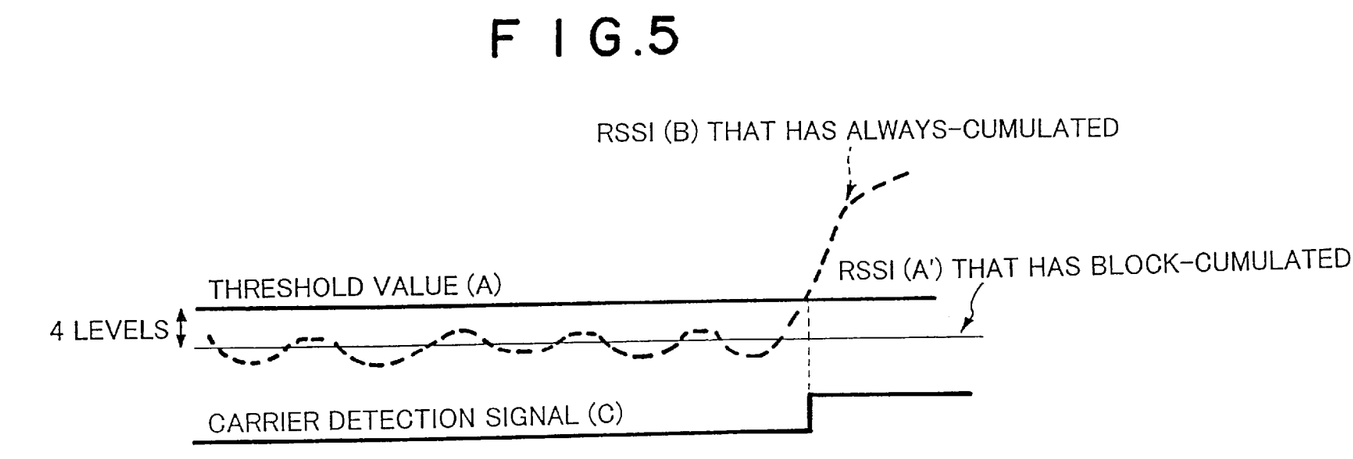
FIG. 5 is a schematic diagram for explaining the operation of the carrier detecting circuit according to the first embodiment of the present invention.
Figure 6:
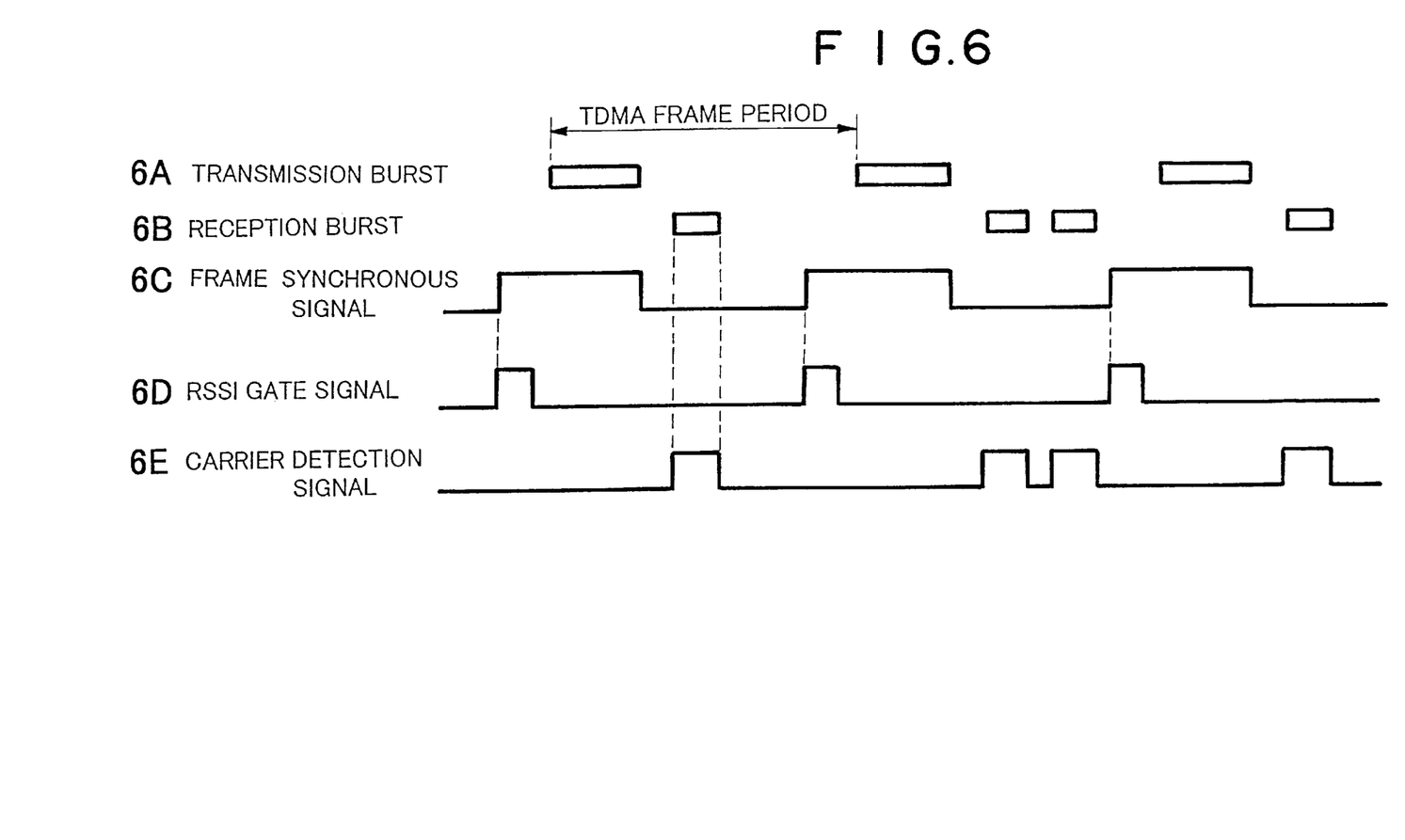
FIGS. 6A, 6B, 6C, 6D, and 6E are schematic diagrams for explaining a controlling operation for calculating an adaptive threshold value of the carrier detecting circuit according to the first embodiment of the present invention.

Next, with reference to signal waveforms shown in FIGS. 5 and 6A to 6E, the operation of the first embodiment shown in FIG. 2 will be described. FIG. 5 is a schematic diagram for explaining the operation corresponding to a carrier detection signal (C). RSSI (B) is a waveform of an RSSI signal that has been always-cumulated and smoothed by the RSSI continuous cumulating circuit 102 at the same clock period as the A/D conversion of the RSSI signal. RSSI (A') is a waveform of an output signal that has been block-cumulated and pre-measured by the RSSI block cumulating circuit 101.

As shown in FIG. 5, the RSSI level raising circuit 103 raises the level of RSSI (A') that has been block-cumulated by for example four levels. Thus, the level of the resultant signal becomes the level of the threshold value (A). RSSI (B) that has been always-cumulated fluctuates corresponding to the level of the received signal. When the level of RSSI (B) exceeds the threshold value (A), the comparing circuit 104 outputs a carrier detection signal (C). Since RSSI (B) that has been always-cumulated is output at the same clock period as the A/D conversion of the RSSI signal, the carrier detection signal (C) can be detected at the same clock period of the A/D conversion of the RSSI signal. Thus, a carrier can be detected at high speed.

On the other hand, in a non-burst region, the RSSI block cumulating circuit 101 turns on/off the switch 202 with an RSSI cumulative gate signal and outputs the threshold value (A). The RSSI block cumulating circuit 101 performs the cumulating operation and the averaging operation 16 times so as to output the threshold value (A). Thus, since the fluctuation of noise in a low level is smoothed, the reliability of the threshold value (A) improves. In addition, since the level of the RSSI signal is raised by the RSSI level raising circuit 103, even if a large noise component is input in a non-cumulative state, the noise component can be prevented from being incorrectly detected as a carrier.

FIGS. 6A to 6E show the operation of a base station in a TDMA/TDD type mobile radio system. Referring to FIGS. 6A to 6E, a transmission burst (see FIG. 6A) is a radio wave that the base station periodically transmits to each mobile terminal unit at each TDMA period. A reception burst (see FIG. 6B) is a radio wave that the base station receives from each mobile teal unit A frame synchronous signal (see FIG. 6C) is a signal that synchronous signal goes high in a guard time region (in a no-signal region between bursts) preceding the transmission burst signal and goes low at the end of the transmission burst signal. With a trigger of the leading edge of the frame synchronous signal, an RSSI gate signal (see FIG. 6D) is generated. The RSSI gate signal is input to the RSSI block cumulating circuit 101. The guard time region of a region in which neither a transmission burst nor a reception burst exists. In the region, while the RSSI gate signal is active, the RSSI signal is cumulated for example 16 times. Thus, an RSSI signal in a low level is obtained. The resultant signal is supplied to the RSSI level raising circuit 103 so as to prevent a carrier from being incorrectly detected due to noise. Consequently, the level of the RSSI signal is raised by a predetermined value. The resultant value is used as the threshold value.

Assuming that the A/D converter has 32 levels from level 0 to level 31 as the amplitude resolution of RSSI and the setting value of the RSSI level raising circuit 102 is four levels, when the cumulated result of the RSSI block cumulating circuit 101 is five levels, since 5+4=9 levels, level of 9 is set as the threshold value for detecting a carrier. In addition, the RSSI continuous cumulating circuit 102 always cumulates RSSI at the same clock period as the A/D conversion of the RSSI signal and smoothes the fluctuation of the noise level. The output signal of the RSSI continuous cumulating circuit 102 is supplied to the comparing circuit 104. The comparing circuit 104 compares the output signal of the RSSI continuous cumulating circuit 102 with the threshold value. When the output signal is larger than the told value, it is determined that a carrier is present Thus, the carrier detection signal (see FIG. 6E) is output while the reception burst is being received, the carrier detection signal is active.

In such a manner, the threshold value for detecting a carrier is measured in the guard time region between a transmission burst and a reception burst. Corresponding to the measured result, the threshold value is set. Thus, received data can be adaptively and accurately demodulated. In addition, since the cumulating method in which after the RSSI signal is detected, the fluctuation of the output signal at the same clock timing as the A/D conversion is use, a carrier can be detected at high speed. Thus, a synchronous preamble added at the beginning of data can be effectively detected. Consequently, the synchronous detecting operation can be performed at high speed.

Second Embodiment

Next, with reference to FIGS. 7 and 8, a second embodiment according to the present invention will be described.

Figure 7:
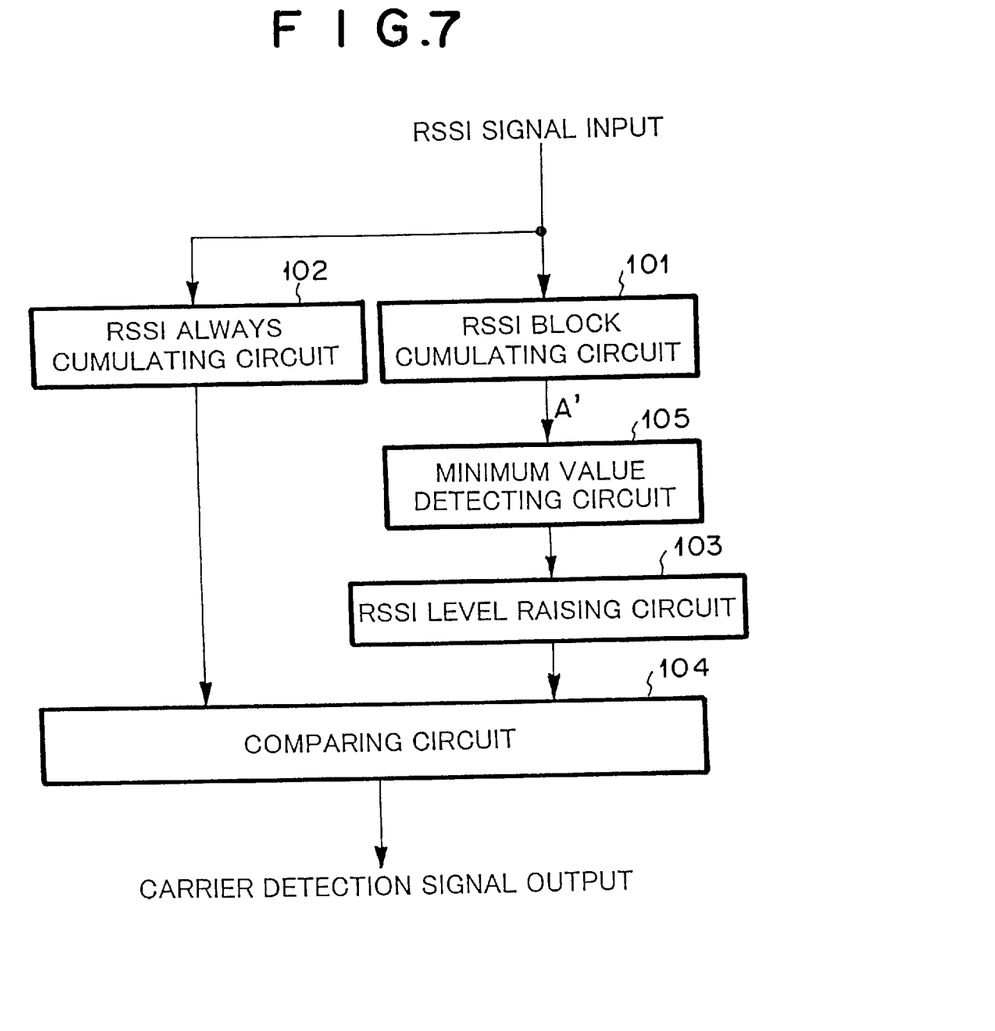
FIG. 7 is a block diagram showing the structure of a carrier detecting circuit according to a second embodiment of the present invention.

Referring to FIG. 7, a mini mum value detecting circuit 105 is disposed between an RSSI block cumulating circuit 101 and an RSSI level raising circuit 102. The minimum value detecting circuit 105 detects the minimum value of the RSSI signal. According to the first embodiment, the RSSI block cumulating circuit 101 cumulates an RSSI signal while an RSSI gate signal generated in a guard time region in which a burst is not received is active and thereby detects the RSSI signal in a low level. However, according to the second embodiment of the present invention, the RSSI signal is successively cumulated for each cumulative block (for example, the cumulating operation is performed 16 times). The minimum value in a predetermined region is detected by the minimum value detecting circuit 104. The RSSI block cumulating circuit 101, the RSSI level raising circuit 103, the RSSI continuous cumulating circuit 102, and the comparing circuit 104 shown in FIG. 7 are the same as those shown in FIG. 1. Thus, their description is omitted.

Figure 8:
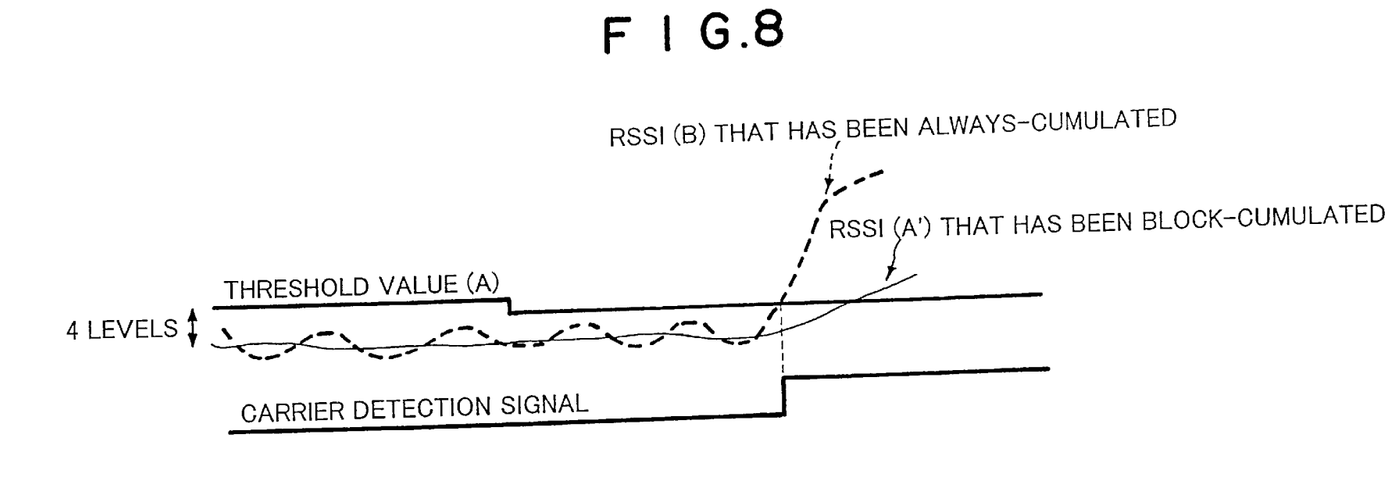
FIG. 8 is a schematic diagram for explaining the operation of the carrier detecting circuit according to the second embodiment of the present invention.

FIG. 8 is a schematic diagram for explaining the operation of the second embodiment of the present invention. RSSI (A') is block-cumulated by the RSSI block cumulating circuit 101 for each cumulative block. The minimum value detecting circuit 105 detects the minimum value in a frame region in which a burst is absent. The RSSI level rising circuit 103 raises the level of the RSSI signal and outputs the resultant value as the threshold value. When RSSI (B) exceeds the threshold value (A), a carrier detection signal is output.

According to the second embodiment of the present invention, in addition to the effect of the first embodiment, even if the position of an RSSI signal in a low level is unknown (namely, a guard time region is unknown), a threshold value can be stably obtained.

For example, in a TDMA/TDD type mobile radio system, when a mobile terminal unit is out of the service area, even if a frame cannot be synchronized, since the minimum value of the frame period is detected by the minimum value detecting circuit 105, the threshold value is lowered. Thus, a down-burst can be obtained from the base station.

According to the present invention, a threshold value for detecting a carrier is measured in a guard time region between a transmission burst and a reception burst. Thus, since the threshold value is adaptively varied, a carrier can be prevented from being incorrectly detected. Thus, the communication area becomes wide. Consequently, the reliability and performance of the receiver are improved.

According to the present invention, since the cumulating method for obtaining a fluctuation output that is the same as the clock timing of the A/D conversion, a carrier can be detected at high speed. Thus, a synchronous preamble added at the beginning of data can be prevented from being wasted.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A carrier detecting circuit for detecting the threshold value of the level of a carrier that can be received, comprising:

means for adaptively varying the threshold value corresponding to a radio environment of at least one of a desired radio wave, a disturbed radio wave, and noise.

2. The carrier detecting circuit as set forth in claim 1, further comprising:

RSSI (Received Signal Strength Indicator) continuous cumulating means for always cumulating an RSSI signal that represents the level of the carrier at the same timing as an A/D converting clock for smoothing a noise level fluctuation and for outputting the resultant signal.

3. The carrier detecting circuit as set forth in claim 1, further comprising:

RSSI block cumulating means for measuring the threshold value in a guard time region between a transmission burst and a reception burst.

4. The carrier detecting circuit as set forth in claim 1, further comprising:

minimum value detecting means for detecting the threshold value as the minimum value in a predetermined region during a transmitting operation or a receiving operation.

5. The carrier detecting circuit as set forth in claim 1, further comprising:

RSSI level raising means for raising the measured value of the threshold value by a predetermine value.

6. The carrier detecting circuit as set forth in claim 2, further comprising:

RSSI block cumulating means for measuring the threshold value in a guard time region between a transmission burst and a reception burst.

7. The carrier detecting circuit as set forth in claim 2, further comprising:

minimum value detecting means for detecting the threshold value as the minimum value in a predetermined region during a transmitting operation or a receiving operation.

8. The carrier detecting circuit as set forth in claim 2, further comprising:

RSSI level raising means for raising the measured value of the threshold value by a predetermine value.

9. The carrier detecting circuit as set forth in claim 3 further comprising:

minimum value detecting means for detecting the threshold value as the minimum value in a predetermined region during a transmitting operation or a receiving operation.

10. The carrier detecting circuit as set forth in claim 3, further comprising:

RSSI level raising means for raising the measured value of the threshold value by a predetermine value.

11. A carrier detecting circuit for detecting a threshold value of the level of a carrier that can be received, comprising:
- an RSSI (Received Signal Strength Indicator) block cumulating circuit for cumulating an RSSI signal of which the level of the carrier has been detected and A/D converted so as to calculate an RSSI signal in a low level;
- an RSSI level raising circuit for raising the RSSI signal calculated by said RSSI block cumulating circuit by a predetermined level;
- an RSSI continuous cumulating circuit for always cumulating the RSSI signal that has been AID converted; and
- a comparing circuit for comparing the threshold value that has been raised by said RSSI continuous cumulating circuit with the output signal of said RSSI continuous cumulating circuit so as to determine whether or not a carrier is present.

12. A communication apparatus for detecting a threshold value of the level of a carrier that can be obtained from a received signal, comprising:
- an RSSI (Received Signal Strength Indicator) block cumulating circuit for cumulating an RSSI signal of which the level of the carrier has been detected and A/D converted so as to calculate an RSSI signal in a low level;
- an RSSI level raising circuit for raising the RSSI signal calculated by said RSSI block cumulating circuit by a predetermined level;
- an RSSI continuous cumulating circuit for always cumulating the RSSI signal that has been A/D converted; and
- a comparing circuit for comparing the threshold value that has been raised by said RSSI continuous cumulating circuit with the output signal of said RSSI continuous cumulating circuit so as to determine whether or not a carrier is present.

13. The communication apparatus as set forth in claim 12, further comprising:
RSSI continuous cumulating means for always cumulating an RSSI signal that represents the level of the carrier at the same timing as an A/D converting clock and for outputting the resultant signal.

14. The communication apparatus as set forth in claim 12, further comprising:
RSSI block cumulating means for measuring the threshold value in a guard time region between a transmission burst and a reception burst.

15. The communication apparatus as set forth in claim 12, further comprising:
minimum value detecting means for detecting the threshold value as the minimum value in a predetermined region during a transmitting operation or a receiving operation.

16. The communication apparatus as set forth in claim 12, further comprising:
RSSI level raising means for raising the measured value of the threshold value by a predetermine value.

17. A carrier detecting circuit, comprising:
- an RSSI block cumulating circuit for cumulating an RSSI signal in a period of a guard time region to output an average signal;
- an RSSI level raising circuit for adding an offset to the average signal to output a threshold;
- an RSSI continuous cumulating circuit for continuously cumulating the RSSI signal in each of shifting periods to output an instantaneous signal; and
- a comparator for comparing the instantaneous signal with the threshold.

18. A carrier detecting circuit, comprising:
- an RSSI block cumulating circuit for cumulating an RSSI signal in a period of a guard time region to output an average signal.
- a minimum value detecting circuit for detecting a minimum value of the average signal;
- an RSSI level raising circuit for adding an offset to the minimum value to output a threshold;
- an RSSI continuous cumulating circuit for continuously cumulating the RSSI signal in each of shifting periods to output an instantaneous signal; and
- a comparator for comparing the instantaneous signal with the threshold.

* * * * *